US009647589B2

(12) United States Patent
Auer et al.

(10) Patent No.: US 9,647,589 B2
(45) Date of Patent: May 9, 2017

(54) ALTERNATOR WITH CURRENT MEASUREMENT

(71) Applicant: Infineon Technologies AG, Neubiberg (DE)

(72) Inventors: Frank Auer, Roehrmoos (DE); Robert Hartmann, Munich (DE); Christoph Seidl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 45 days.

(21) Appl. No.: 14/746,278

(22) Filed: Jun. 22, 2015

(65) Prior Publication Data
US 2016/0373040 A1 Dec. 22, 2016

(51) Int. Cl.
H02P 11/00 (2006.01)
H02H 7/06 (2006.01)
H02P 9/00 (2006.01)
H02P 9/04 (2006.01)
G06F 19/00 (2011.01)
G06G 7/70 (2006.01)

(52) U.S. Cl.
CPC ..................... *H02P 9/04* (2013.01)

(58) Field of Classification Search
USPC ............................. 322/25; 123/179; 701/101
See application file for complete search history.

(56) References Cited

U.S. PATENT DOCUMENTS

| | | | | |
|---|---|---|---|---|
| 6,807,476 B2 * | 10/2004 | Ando | ...................... | B60K 6/24 123/179.4 |
| 6,816,759 B2 * | 11/2004 | Kimura | .................. | B60K 6/445 180/233 |
| 6,875,154 B2 * | 4/2005 | Mitsutani | .............. | F02D 41/021 123/179.4 |
| 6,931,318 B2 * | 8/2005 | Kaita | ..................... | B60K 6/445 123/179.3 |
| 6,973,383 B2 * | 12/2005 | Mitsutani | .............. | F02D 31/003 123/179.3 |
| 7,150,254 B2 * | 12/2006 | Ichimoto | ................ | B60K 6/445 123/179.16 |
| 7,204,222 B2 * | 4/2007 | Yamauchi | .............. | B60K 6/445 123/179.4 |
| 7,516,726 B2 * | 4/2009 | Esaka | ................... | H02J 7/0019 123/179.3 |

(Continued)

OTHER PUBLICATIONS

Infineon Technologies AG, "Your path to robust and reliable in-vehicle networking", retrieved from the internet http://www.infineon.com/dgdl/Infineon-Automotive+Networking_2016-ABR-v01_00-EN.pdf?fileId=5546d462584d1d4a0158870bebb45f12, Nov. 2016, 36 pp.

(Continued)

*Primary Examiner* — Pedro J Cuevas
(74) *Attorney, Agent, or Firm* — Shumaker & Sieffert, P.A.

(57) ABSTRACT

An alternator is described that is configured to provide a current for powering one or more loads. The alternator includes an output port configured to output the current for powering the one or more loads, and one or more current sensors configured to measure a current level of at least a portion of the current being output via the output port to the one or more loads. The alternator further includes one or more communication ports configured to transmit information based on the current level measured by the one or more current sensors.

20 Claims, 5 Drawing Sheets

(56) References Cited

U.S. PATENT DOCUMENTS

| | | | | |
|---|---|---|---|---|
| 7,631,710 | B2* | 12/2009 | Utsumi | F02D 29/02 123/179.3 |
| 7,751,965 | B2* | 7/2010 | Ando | F02P 5/1506 123/179.3 |
| 7,788,023 | B2* | 8/2010 | Ando | B60K 6/445 123/179.3 |
| 7,839,116 | B2* | 11/2010 | Esaka | B60K 6/28 123/179.3 |
| 7,983,833 | B2* | 7/2011 | Sugai | B60K 6/445 123/179.4 |
| 8,050,851 | B2* | 11/2011 | Aoki | B60K 6/445 123/179.4 |
| 8,065,069 | B2* | 11/2011 | Jinno | B60K 6/445 123/179.4 |
| 8,170,778 | B2* | 5/2012 | Ando | F02D 29/02 123/179.16 |
| 8,271,156 | B2* | 9/2012 | Jinno | B60K 6/44 123/179.3 |
| 8,380,376 | B2* | 2/2013 | Akimoto | B60K 6/445 701/101 |
| 9,375,247 | B2 | 6/2016 | Orszulak | A61B 18/1206 |
| 2003/0154945 | A1* | 8/2003 | Ando | B60K 6/445 123/179.3 |
| 2004/0006419 | A1* | 1/2004 | Kimura | B60K 6/445 701/101 |
| 2004/0015285 | A1* | 1/2004 | Mitsutani | F02D 31/003 701/101 |
| 2004/0084002 | A1* | 5/2004 | Mitsutani | F02D 41/021 123/179.4 |
| 2004/0231627 | A1* | 11/2004 | Kaita | B60K 6/445 123/179.3 |
| 2005/0178594 | A1* | 8/2005 | Yamauchi | B60K 6/445 180/65.235 |
| 2005/0216176 | A1* | 9/2005 | Ichimoto | F02D 41/065 701/112 |
| 2005/0229890 | A1* | 10/2005 | Ichimoto | B60K 6/445 123/179.4 |
| 2006/0161328 | A1* | 7/2006 | Hoshiba | B60K 6/365 701/84 |
| 2007/0049456 | A1* | 3/2007 | Shimizu | B60K 6/44 477/3 |
| 2007/0151536 | A1* | 7/2007 | Yamauchi | B60K 6/445 123/179.4 |
| 2007/0296358 | A1* | 12/2007 | Sato | B60K 6/44 318/139 |
| 2008/0072859 | A1* | 3/2008 | Esaka | H02J 7/0019 123/179.3 |
| 2008/0086255 | A1* | 4/2008 | Oshima | B60K 6/445 701/101 |
| 2009/0015193 | A1* | 1/2009 | Esaka | B60K 6/28 320/103 |
| 2009/0151469 | A1* | 6/2009 | Suzuki | B60K 6/445 73/847 |
| 2012/0239026 | A1* | 9/2012 | Orszulak | A61B 18/1206 606/35 |
| 2013/0238219 | A1* | 9/2013 | Ando | F02D 41/22 701/102 |
| 2016/0280208 | A1* | 9/2016 | Yamauchi | B60W 20/13 |
| 2016/0305990 | A1* | 10/2016 | Orszulak | A61B 18/1206 |

OTHER PUBLICATIONS

Infineon Technologies AG, "LIN-Driver Software implemented LIN Protocol for Infineon's 16 bit microcontrollers", retreived from the Internet http://www.infineon.com/dgdl/ap1608613_Lin_Driver.pdf?fileld=db3a3043133ffd3001134449cdbf0200, Aug. 2004, 64 pp.

Infineon Technologies AG, "CAN Connecting C166 and C500 Microcontroller to CA", retrieved from the Internet http://www.infineon.com/dgdl/Ap2900010_C166_C500_CAN.pdf?fileld=db3a304412b407950112b41975592877, Feb. 2004, 68 pp.

\* cited by examiner

ALTERNATOR WITH CURRENT MEASUREMENT

BACKGROUND

Some systems in may use an alternator for converting mechanical energy into electrical energy for powering a load. For example, most modern automobiles include an alternator that converts mechanical energy produced by a combustion engine to electrical energy that the alternator delivers to a twelve or twenty-four volt on-board power supply network (or "board net" for short) for powering one or more loads. Alternators are also commonly used in other vehicles and machinery.

An engine control unit (ECU) may manage power consumption of one or more loads drawing electrical power from a board net. The ECU may perform load balancing of the board net by monitoring variations in the current flowing through the rotating coil of the alternator (also referred to as "excitation current") to determine the power of the alternator acting against the combustion engine or whether the alternator has any remaining capacity for powering any additional loads. Since monitoring the output current of the alternator directly may be a challenge for some automobile systems, an ECU may instead estimate the output current of an alternator using a model. However even finely tuned and calibrated models can be inaccurate in some situations. Without an accurate indication of the level of the current being output from the alternator, an ECU may be unable to perform accurate power management of the board net.

SUMMARY in one example, the disclosure is directed to an alternator configured to provide a current for powering one or more loads. The alternator includes an output port configured to output the current for powering the one or more loads, a current sensor configured to measure a current level of at least a portion of the current being output via the output port to the one or more loads, and a communication port configured to transmit information based on the current level measured by the current sensor.

In another example, the disclosure is directed an alternator configured to provide a direct current for powering one or more loads. The alternator includes an output port configured to output the direct current for powering the one or more loads, a rectifier for converting an alternating current generated by the alternator to the direct current for powering the one or more loads, a current sensor configured to measure a current level of at least a portion of the current being output via the output port to the one or more loads, and a communication port configured to transmit information based on the current level measured by the current sensor.

In another example, the disclosure is directed to an alternator configured to provide a direct current for powering one or more loads. The alternator includes an output port configured to output the direct current for powering the one or more loads, and a rectifier for converting an alternating current generated by the alternator to the direct current for powering the one or more loads. The rectifier includes a plurality of phases including a single phase that comprises a current sensor, the current sensor being configured to measure a current level of at least a portion of the direct current being output via the output port to the one or more loads. The alternator further includes a communication port configured to transmit information based on the current level measured by the current sensor.

The details of one or more examples are set forth in the accompanying drawings and the description below. Other features, objects, and advantages of the disclosure will be apparent from the description and drawings, and from the claims.

DETAILED DESCRIPTION

In general, circuits and techniques are described for enabling an alternator to measure a level of current being output from the alternator to power one or more loads and output an indication of the measured current level to an engine control unit (ECU) or other external control device. In some examples, the alternator can output the indication of the measured current level via a pre-existing communication link that the alternator shares with an ECU or other external control devices. In other examples, the alternator can output the indication of the measured current level via an additional output port that is separate from the pre-existing communication link.

Figure 1:
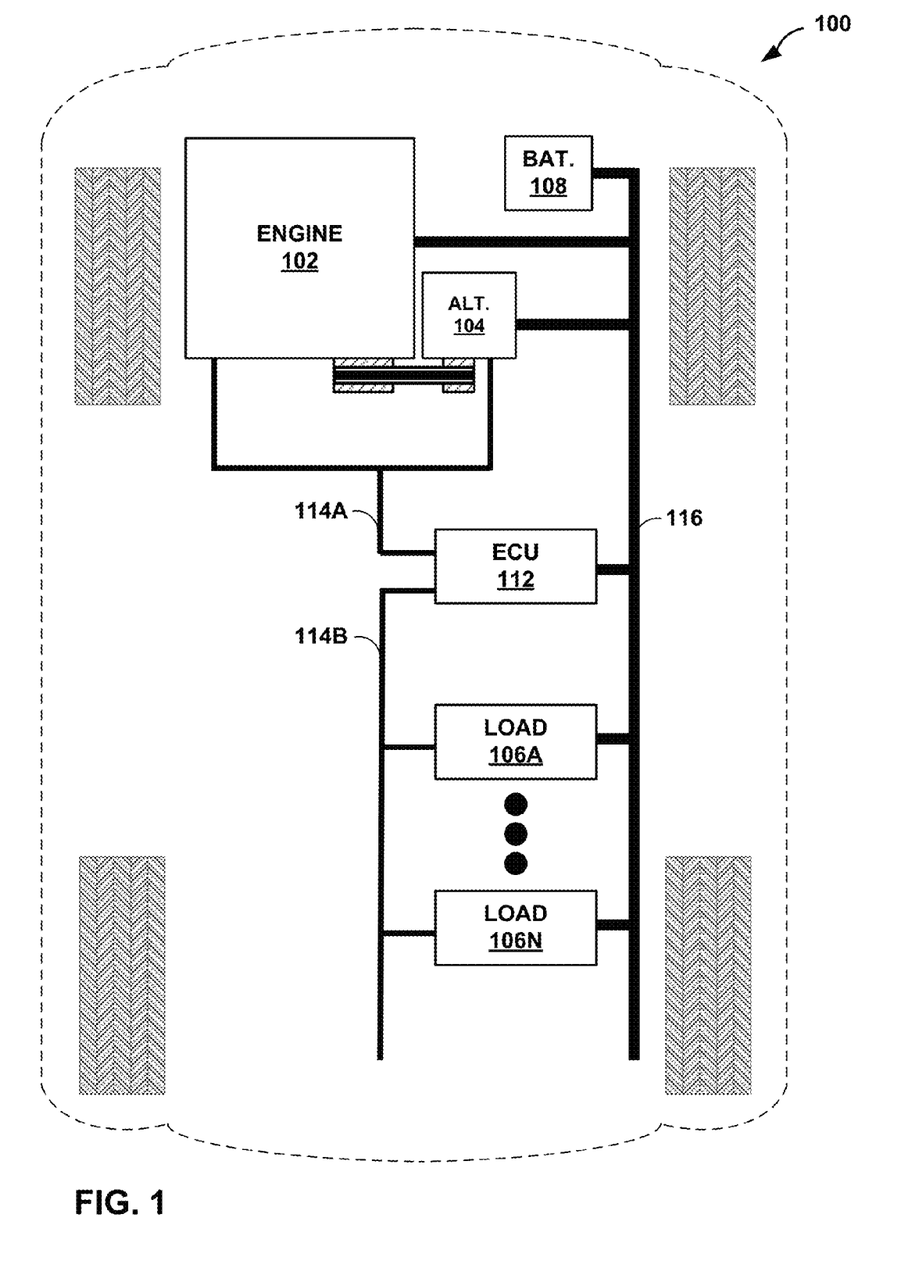
FIG. 1 is a conceptual diagram illustrating an example electrical on-board power supply network of an automobile.

FIG. 1 is a conceptual diagram illustrating system 100 as an example electrical on-board power supply network of an automobile. Even though FIG. 1 shows system 100, as one example, as being part of an automobile, the techniques of this disclosure should not be limited to automobiles or other vehicle systems since the following circuits and techniques are generally applicable to any system that relies on an alternator.

System 100 (also referred to herein as electrical on-board power supply network 100 or simply "board net" 100) includes engine 102, alternator 104, battery 108, engine control unit (ECU) 112, and electrical loads 106A-106N (collectively "loads 106"). System 100 also includes communication buses 114A and 114B, and power bus 116. Each of components 102, 104, 106, 108, and 112 draws electrical power from system 100 via power bus 116. Two or more of components 102, 104, 106, 108, and 112 may communicate via communication buses 114A and 114B.

Engine 102 is any type of engine, motor, or turbine configured to convert one form of energy into mechanical energy (e.g., for spinning one or more rotors of an alternator, such as alternator 104). For example, engine 102 may be a gasoline combustion engine, a diesel engine, a hydrogen motor, a nuclear engine, a turbine, a steam engine, or any other type of engine or motor.

Battery 108 provides a stabilizing voltage to power bus 116 to support ECU 112, engine 102, loads 6 and any other electrical components connected to power bus 116 when alternator 104 is offline. For example, at start-up, battery 108 may provide the electrical energy needed to power ECU 112 and provide the initial sparks that start engine 102.

Loads 106 represent electrical components that draw electrical power from power bus 116 of system 100. Numerous examples of loads 106 exist and include, but are not limited to, lighting systems, computing systems, control units, sensor systems, pumps, engines, motors, switches, actuators, heating, ventilating, and air conditioning (HVAC) systems, security systems, and any other conceivable system or component that draws electrical power from an alternator, such as alternator 104.

Alternator 104 converts the mechanical energy produced by engine 102 into electrical energy that alternator 104 outputs to bus 116 for powering ECU 112, loads 106, engine 102, and/or battery 108. For example, alternator 104 may be mechanically coupled to engine 102 (e.g., via a belt system). Alternator 104 may include a generator consisting of a stator and a rotor unit that turns as engine 102 causes the belt system to spin. The spinning rotor may cause the stator to produce an alternating current inside alternator 104. A control unit of alternator 4 may monitor the voltage level of the board net and, based on a controlling algorithm, applies a specific amount of excitation current to the spinning rotor. A rectifier of alternator 104 may output the electrical energy produced by alternator 104 as a direct current at bus 116. The electrical energy alternator 104 provides to bus 116 may be the primary source of electrical energy of system 100. The direct current provided by battery 108 to bus 116 may be a secondary source of electrical energy. The connection that alternator 104 maintains with bus 116 may be referred to as a port (e.g., an output port).

ECU 112 provides command and control signals to components of system 100 to cause system 100 to perform an operation. For example, ECU 112 may manage power consumption of loads 106 and engine 102 as loads 106 and control units of engine 102 draw electrical power from power bus 116.

ECU 112 may comprise any suitable arrangement of hardware, software, firmware, or any combination thereof, to perform the techniques attributed to ECU 112 herein. For example, ECU 112 may include any one or more microprocessors, digital signal processors (DSPs), application specific integrated circuits (ASICs), field programmable gate arrays (FPGAs), or any other equivalent or discrete logic circuitry, as well as any combinations of such components. When ECU 112 includes software or firmware, ECU 112 further includes any necessary hardware for storing and executing the software or firmware, such as one or more processors or processing units.

In general, a processing unit may include one or more microprocessors, DSPs, ASICs, FPGAs, or any other equivalent or discrete logic circuitry, as well as any combinations of such components. Although not shown in FIG. 1, ECU 112 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to ECU 112, e.g., may be external to a package in which ECU 112 is housed.

ECU 112 may communicate with components 102, 104, and 106 via communication buses 114A and 114B. For example, ECU 112 and alternator 104 may share information over bus 114A that assists the control unit of alternator 4 in controlling the power output of alternator 104. Communication buses 114A and 114B represents any communication links or data paths that facilitate the exchange of information between two or more components of system 100 and related sub-components. Although communication buses 114A and 114B are shown as single lines, buses 114A and 114B can be any combination of one or more wireless or physical communication paths between buses 114A and components 102, 104, and 112 and between buses 114B and components 106 and 112. The connection that alternator 104 maintains with bus 114A may be referred to as a port (e.g., an I/O port).

Components 102, 104, 106, and 112 may communicate over buses 114A and 114B using a message based protocol. For example, ECU 112 may send and receive data at bus 114A as one or more messages being received and transmitted by alternator 104. Components 106 and 112 may communicate over bus 114B using a message based protocol. Messages on communication buses 114A and 114B may be formatted in accordance with a message-based protocol, such as Local Interconnect Network (LIN) protocol, Controller Area Network (CAN) protocol, FlexRay™ protocol, Ethernet protocol or another type of message-based communication protocol. Each of components 102, 104, 106, and 112 that communicate according to these message-based protocols may rely on timing restrictions and specific data message headers defined by these protocols to minimize and prevent data communications between two components 102, 104, 106, and 112 from interfering with the data communications between two different components 102, 104, 106, and 112.

ECU 112 may perform load balancing of power bus 116 and system 100 to determine whether alternator 104 has any remaining capacity for powering any additional loads 106 that are not already receiving power from bus 116. For example, ECU 112 may switch-on additional electrical loads 106 if ECU 112 determines the output current of alternator 104 will support the additional power drain or may switch-off other loads 106 if the output current indicates alternator 104 is already producing a maximum output current and that any further drain on power bus 116 would necessarily have to come from battery 108, or would lead to drop voltage level in the board net. Since monitoring the load current at bus 116 directly may be a challenge for some automobile systems, ECU may 112 instead estimate the output current of alternator 104 using a model.

Figure 2:
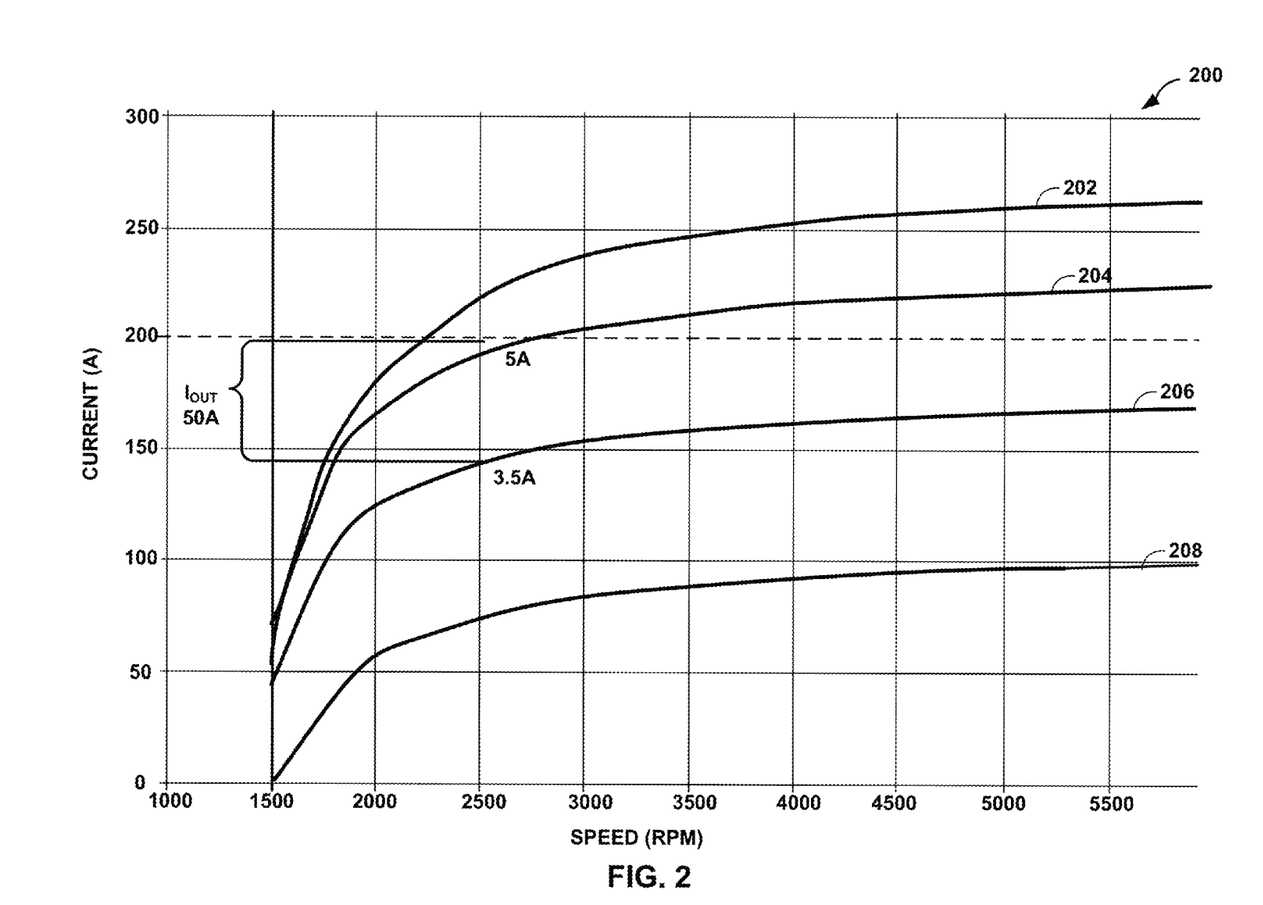
FIG. 2 is a line graph illustrating an output current model for an alternator.

FIG. 2 is a line graph illustrating output current model 200 for an alternator. FIG. 2 is described in the context of system 100 of FIG. 1. ECU 112 may rely on model 200 to predict the output current from alternator 104.

Model 200 shows variations in alternator output current levels for different alternator speeds, depending on excitation current levels. Each of lines 202-208 represents the output current level of alternator 104 for different DC supply currents to an electromagnetic rotor coil. Depending on the monitored voltage level of the board net by the control unit, the excitation current may vary the strength of the electromagnetic rotor coil supplied by control unit. The output current of alternator 104 hence depends of the speed of the rotor (in revolutions per minute) and the excitation current.

Line 202 represents the output current of alternator 104 when the excitation current is at approximately six amperes (amps) and line 204 represents the output current of alternator 104 when the excitation current is closer to five amps. Line 206 represents the output current of alternator 104 when the excitation current is at approximately three and one half amps, and line 208 represents the output current of alternator 104 when the excitation current is at around two amps.

As indicated above, ECU 112 and alternator 104 may exchange information via bus 114A which, in some example, is a LIN interface. Examples of the types of information sent from ECU 112 to alternator 104 over the LIN interface include: a voltage set point for a battery voltage, a maximum current for an excitation coil, parameters for a load response control function, and a selection for the read back of the next command. Examples of the types of information sent from alternator 104 to ECU 112 include: an applied Duty Cycle at the excitation pin to generate a specific amount of excitation current, a measured battery voltage, a measured excitation current, a measured speed of alternator 104, a measured temperature, and a measured excitation current.

Based on the information received from alternator 104, ECU 112 may calculate, using the information associated with model 200, the actual output current and output capability of alternator 104 and the amount of additional available power. For example, ECU 112 may receive an indication of the excitation current and the speed of alternator 104, and perform a look up of the speed and excitation current in model 200. For example, this look-up may be implemented in a table or modeled by using information of excitation current, Duty Cycle for the excitation current and actual voltage level of board net. Based on the computed output current, output capability and the reserve of the alternator, ECU 112 may switch on or switch-off one or more loads 106.

However, even finely tuned and calibrated models can be inaccurate in some situations. For example, model 200 may be developed for use across many alternators that each have slight variations to fit with machine setup and parameters. In addition, different alternators of the same type may have slight variations in the accuracy of the excitation current measurement being used to predict the output current.

Without an accurate indication of the level of current that is being output from the alternator, ECU 112 may be unable to perform accurate power management of bus 116. For instance, FIG. 2 shows that even slight variations in excitation current (e.g., from three and one half to five amperes at twenty-five hundred RPM) can produce a modeled difference of fifty amperes in output current. A further disadvantage of modeling output current of alternators is that ECU 112 may have to store different models or look-up table for different alternator manufacturers to exactly measure actual output current of alternator 104 independent from different machine parameters and setup. For these and other reasons, the circuits and devices of this disclosure may be configured to measure current level output by the alternator, and provide an indication of the measured current level output.

Figure 3:
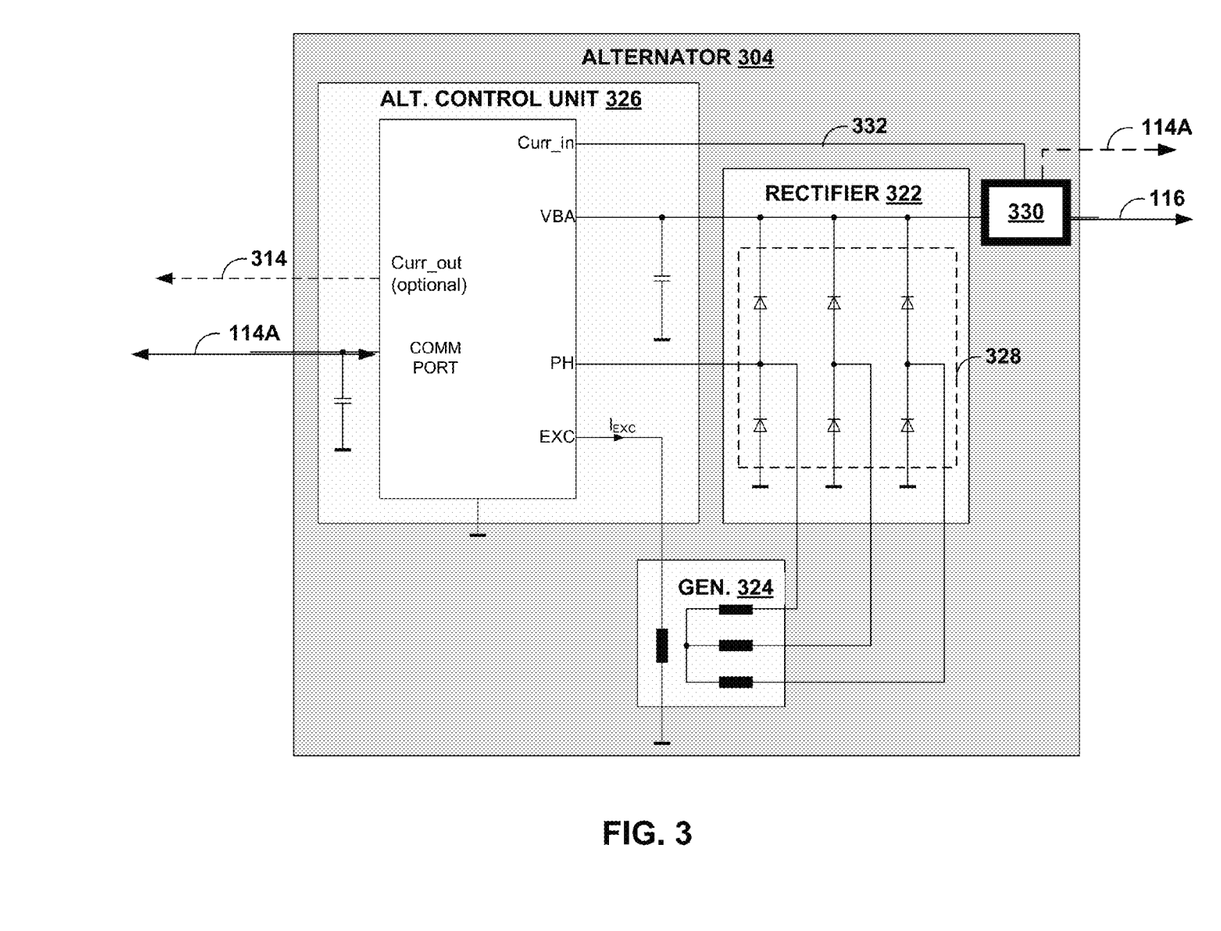
FIG. 3 is a conceptual diagram illustrating an example alternator that powers the example electrical on-board power supply network of FIG. 1, in accordance with one or more aspects of the present disclosure.

FIG. 3 is a conceptual diagram illustrating alternator 304 as an example alternator that powers the example electrical on-board power supply network 100 of FIG. 1, in accordance with one or more aspects of the present disclosure. For example, alternator 304 may be used in place of alternator 104 of system 100. FIG. 3 is described in the context of system 100 of FIG. 1.

Alternator 304 includes alternator control unit 326, an exemplary rectifier 322, generator 324, and current sensor 330. Rectifier 322 includes a plurality of phases 328. Alternator 304 includes a communication port coupled to communication bus 114A (e.g., a LIN interface) and an output port coupled to power bus 116. In some examples, alternator 304 also includes an additional output port 314 that alternator 304 uses for transmitting information about the measured current level at bus 116.

Rectifier 322 is configured to convert a multi-phase (e.g., three-phase, five-phase, six-phase, or any other quantity of phases) alternating current generated by generator 324 of alternator 304 to a direct current used for powering loads 106 at power bus 116. Rectifier 322 includes a plurality of phases 328. Each phase of the plurality of phases 328 converts a corresponding phase of the alternating current being produced by generator 328 into a portion of the direct current that alternator 304 provides at bus 116 for powering loads 106. Rectifier 322 combines the portion of the direct current being output from each phase 328 into a single direct current that is output to bus 116. The plurality of phases 328 of rectifier 322 are electrically coupled to the stator of generator 324.

Generator 324 is configured to produce the current that alternator 304 outputs for powering loads 106 at bus 116. For example, generator 324 includes an excitation coil, a stator, and a rotor. The rotor is mechanically coupled to a mechanical energy source, such as engine 102. The rotor is configured to spin based on the mechanical energy produces by the mechanical energy source. When the excitation coil causes an excitation current to charge the rotor of generator 324 as the rotor is spinning, the rotor produces an electrical field which induces a current at the stator of generator 304.

Alternator control unit 326 generally controls the operations performed by alternator 304 including the level of excitation current at the rotor of generator 324. Alternator control unit 326 regulates the current in the excitation coil of generator 324 to ensure a stable battery voltage at bus 116.

Alternator control unit 326 can comprise any suitable arrangement of hardware, software, firmware, or any combination thereof, to perform the techniques attributed to alternator control unit 326 herein. For example, alternator control unit 326 may include any one or more microprocessors, DSPs, ASICs, FPGAs, or any other equivalent or discrete logic circuitry, as well as any combinations of such components. When alternator control unit 326 includes software or firmware, alternator control unit 326 further includes any necessary hardware for storing and executing the software or firmware, such as one or more processors or processing units. Although not shown in FIG. 3, alternator control unit 326 may include a memory configured to store data. In some examples, the memory may be external to alternator control unit 326, e.g., may be external to a package in which alternator control unit 326 is housed.

Alternator control unit 326 may send an excitation current signal to generator 324 to control the amount of current at the excitation coil and rotor of generator 324. In some examples, the excitation current signal may be a pulse-width-modulation signal or a signal based on some other modulation technique. Alternator control unit 326 may vary the modulation of the excitation current signal to vary the level of excitation current running through the excitation coil and out to the rotor of generator 324.

Alternator control unit 326 may vary the modulation of (e.g., the duly cycle of) the excitation current signal based on the battery voltage (VBA) that alternator control unit 326 measures at power bus 116. In other words, alternator control unit 326 may regulate VBA based by increasing or decreasing the excitation current at generator 324. Alternator control unit 326 may determine a different excitation current signal depending on the voltage level at bus 116.

Alternator control unit 326 may communicate with ECU 112 to exchange information for controlling the amount of current and/or voltage at power bus 116. For example, alternator control unit 326 may receive information (e.g., a signal or command) via communication bus 114A from ECU 112 and based on that information, alternator control unit 326 may increase the amount of the excitation current being sent to generator 328 or decrease the excitation current. In this way, alternator 304 may be controlled based at least in part on information received via bus 114A from ECU 112.

Examples of the types of information sent from ECU 112 to alternator 304 over communication bus 114A include: a voltage set point for a battery voltage, a maximum current for an excitation coil, parameters for a load response control function, and a selection for the read back of the next command. Examples of the types of information sent from alternator 304 to ECU 112 over communication bus 114A include: an applied Duty Cycle at the excitation pin, a measured battery voltage, a measured excitation current, a measured speed of alternator 104, a measured temperature, and a measured excitation current.

Rather than requiring ECU 112 to rely on a model to compute the output current of alternator 304, alternator 304 is configured to measure the output current directly and transmit an indication of the measured output current to ECU 112. In this way, alternator 304 provides very accurate information to ECU 112 for use in managing the electrical energy at bus 116.

Alternator 304 includes current sensor 330 which is configured to measure a current level of at least a portion of the current being output via the output port at bus 116. Current sensor 330 may be implemented at or near a battery voltage output port of alternator 304. In some examples, current sensor 330 is a Hall sensor but may be any other type of sensor that is configured to measure current. In the example of FIG. 3, rectifier 322 excludes current sensor 330 however in other examples, such as the example FIG. 4, rectifier 322 may include current sensor 330.

In some examples, alternator 304 transmits the output current level to ECU 112 via an optional dedicated communication port 314. In other examples, alternator 304 relies on an already existing communication port and outputs the current level directly, via communication bus 114A (e.g. a LIN interface). For example, alternator 304 may be "plug and play" compatible with existing systems that rely on LIN protocol communication since in some examples, alternator 304 can communicate the measured output current via the LIN messages that alternator 304 already transmits to ECU 112. Said differently, alternator 304 may output an indication of the measured output current without interfering with LIN message communication that occurs between ECU 112 and other components of system 100.

Alternator control unit 326 may receive, from current sensor 330, an indication of the current level (e.g., a digital or an analog signal) measured by current sensor 330. For example, alternator control unit 326 may receive information via a direct link 332 that alternator control unit 326 shares with current sensor 330. Alternator control unit 326 may transmit, via communication bus 114, and to ECU 112, the information. For example, alternator control unit 326 may output an indication of the measured output current to ECU 112 using LIN message protocol.

In some examples, alternator control unit 326 receives an analog signal as the indication of the current level detected by current sensor 330. Alternator control unit 326 may convert the measured analog signal to a digital signal (e.g., a message) and output the digital signal over bus 114A as one or more local interconnect network (LIN) messages received by ECU 112. In this way, alternator 304 may provide a digital output signal associated with current sensor 330 to ECU 112 via a standard LIN interface. In another example, current sensor 330 directly transmits an indication of the measured output current to ECU 112 via the communication bus 114A so that current sensor has its dedicated communication port.

Figure 4:
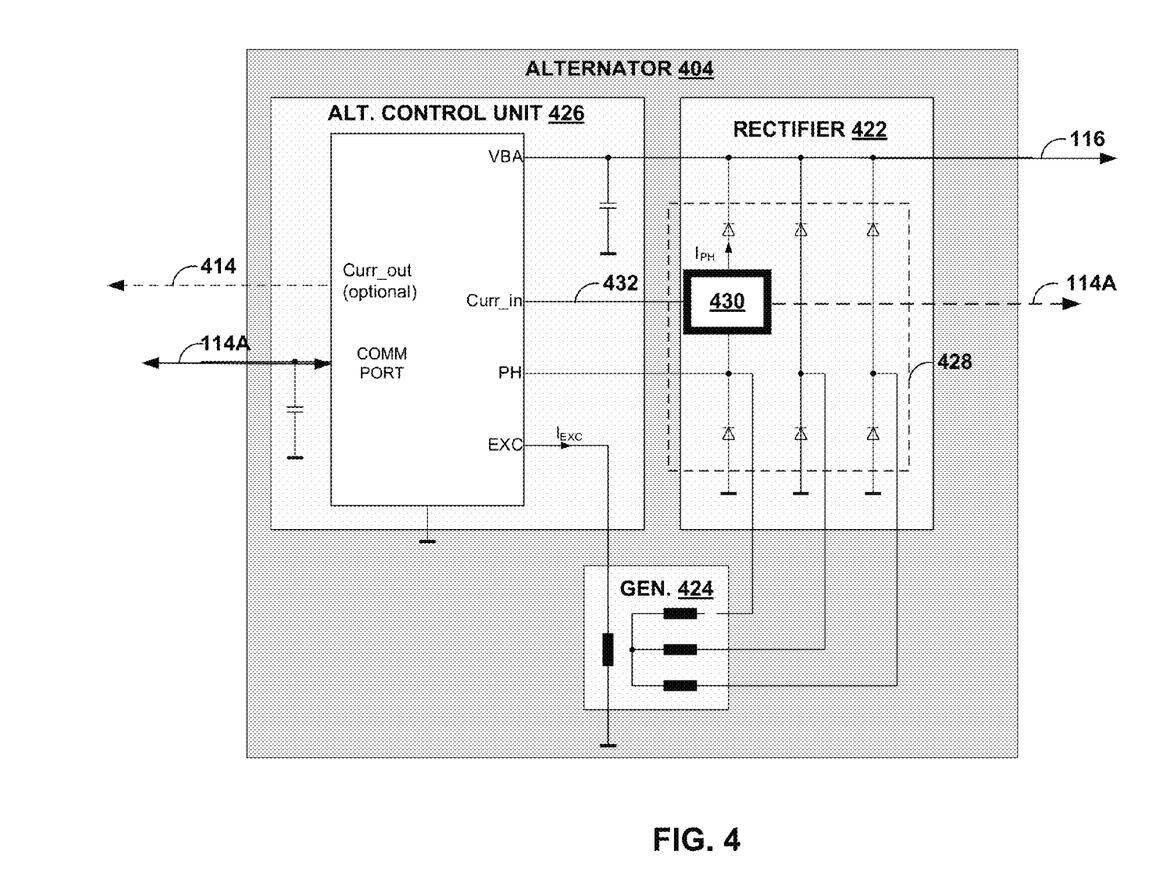
FIG. 4 is a conceptual diagram illustrating an additional example of the alternator that powers the example electrical on-board power supply network of FIG. 1, in accordance with one or more aspects of the present disclosure.

FIG. 4 is a conceptual diagram illustrating alternator 404 as an example alternator that powers the example electrical on-board power supply network 100 of FIG. 1, in accordance with one or more aspects of the present disclosure. For example, alternator 404 may be used in place of alternator 104 of system 100. FIG. 4 is described in the context of system 100 of FIG. 1.

Alternator 404 includes alternator control unit 426, an exemplary rectifier 422, and generator 424. Rectifier 422 includes a plurality of phases 428. Alternator 404 includes a communication port coupled to communication bus 114A (e.g., a LIN interface) and an output port coupled to power bus 116. In some examples, alternator 404 also includes an additional output port 414 that alternator 404 uses for transmitting information about the measured current level at bus 116.

The difference between alternator 304 of FIG. 3 and alternator 404 of FIG. 4 is that alternator 404 includes current sensor 430 within a single phase from the plurality of phases 428 of rectifier 422, rather than outside rectifier 422 (e.g., as is the case with alternator 304). Current sensor 430 may also be a Hall sensor, however in some examples, current sensor 430 be a much smaller (e.g., in size, cost, and/or complexity) variant of current sensor 330. In some examples, current sensor 430 is any other type of sensor that is configured to measure a phase current of rectifier 428. Rather than being capable of measuring the entire output current at bus 116, current sensor 430 may be capable of only measuring a single phase current or in other words, a fraction (e.g., one third) of the current that rectifier 422 outputs at bus 116.

Current sensor 430 may measure the phase current within one of phases 428 and deliver the information to alternator control unit 426. Alternator control unit 426 may compute the actual output current of alternator 404 based on the measured phase current level and sends the computed result to ECU 112 via bus 114. Current sensor 430 may be implemented more easily that current sensor 330 since current sensor 430 may be implemented at a single one of phases 428.

Alternator control unit 426 may receive, from current sensor 430, an indication of the current level (e.g., a digital or an analog signal) of a single phase of rectifier 422 that is measured by current sensor 430. For example, alternator control unit 426 may receive information via a direct link that alternator control unit 426 shares with current sensor 430.

Based on the single phase current level measured by current sensor 430, alternator control unit 426 may compute the total current being output to bus 116. For example, alternator control unit 426 may multiply the current level by the total quantity (e.g., three, five, six, or any other quantity) of phases 428 at rectifier 422. In some examples, alternator control unit 426 receives an analog signal as the indication of the current level detected by current sensor 430. Alternator control unit 426 may convert the measured analog signal to a digital signal (e.g., a message) before or after computing the total current value.

Alternator control unit 426 may transmit, via communication bus 114A, to ECU 112, information that indicates the total current being output to bus 116. Alternator control unit 426 may output the digital signal over bus 114A. In some examples, rather than transmit the output current level via bus 114A (e.g., a LIN interface), alternator 404 may output the measured current level via an optional, additional output port 414 that alternator control unit 426 shares with ECU 112. In another example, the current sensor 430 directly transmits an indication of the measured phase current to ECU 112 via the communication bus 114A so that current sensor 114A has its dedicated communication port.

Figure 5:
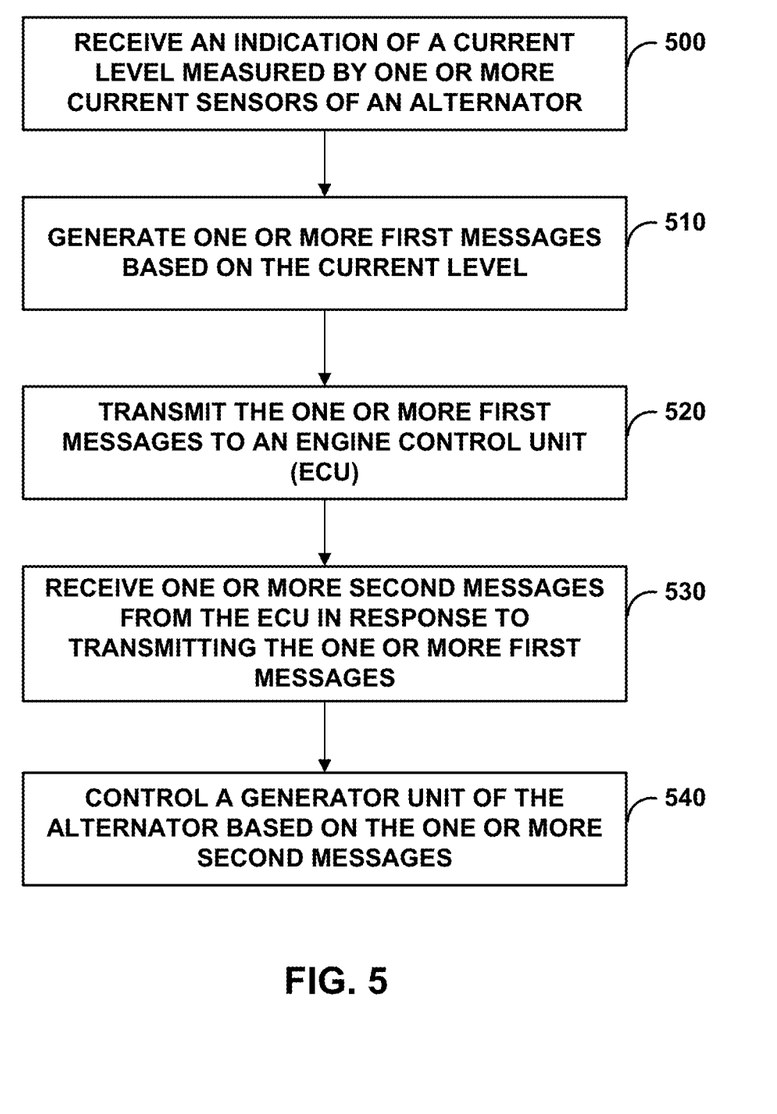
FIG. 5 is a flow chart illustrating example operations performed by an example alternator, in accordance with one or more aspects of the present disclosure.

FIG. 5 is a flow chart illustrating example operations 500-540 performed by an example alternator, such as alternators 304 and 404 of FIGS. 3 and 4, in accordance with one or more aspects of the present disclosure. For the sake of brevity, operations 500-540 are described as primarily being performed by alternator control unit 326 of FIG. 3. However, it should be understood that in other examples, alternator control unit 426 of FIG. 4 may perform operations 500-540.

In operation, alternator control unit 326 may receive an indication of a current level measured by one or more current sensors (500). For example, current sensor 330 may transmit data (e.g., an analog or digital signal) to alternator control unit 326 that indicates the measured amount of current being output by alternator 204 to bus 116.

Alternator control unit 326 may generate one or more first messages based on the current level (510). For example, alternator control unit 326 may interpret the data received from current sensor 330 as being a measured current level and package the data into a LIN protocol message that alternator control unit 326 will be sending to ECU 112. In the case of alternator control unit 426, alternator control unit 426 may have to compute the total current level by multiplying the in-phase measured current level by the quantity (e.g., three, five, six, or any other quantity) of phases of rectifier 422.

In any case, alternator control unit 326 may transmit the one or more first messages to an engine control unit (ECU) (520). For example, in accordance with the LIN protocol, and during the appropriate time slice allocated to alternator 304, alternator control unit 326 may output the one or more messages that contain the measured current level onto bus 114A for transmission to ECU 112.

Alternator control unit 326 may receive one or more second messages from the ECU in response to outputting the one or more first messages (530). For example, ECU 112 may receive the indication of the output current level of alternator 304 and use that information to control alternator 304. By controlling, ECU 112 may send information to alternator control unit 326 (e.g., commands, signals, or other control information) that causes alternator control unit 326 to vary the output current. For instance, alternator control unit 326 may receive, via the communication port attached to bus 114, from engine control unit 112, second information for adjusting the current level of at least a portion of the current being output via the first output attached to bus 116 to the one or more loads.

Alternator control unit 326 may control the generator unit of the alternator based on the one or more second messages (540). For example, alternator control unit 326 may unpack the LIN messages received from ECU 112 and determine that the messages contain information for varying the level of output current on bus 116. Alternator control unit 326 may send information to generator unit 324 that causes generator unit 324 to vary the phase currents being sent to rectifier 322, according to the information received front ECU 112. For instance, alternator control unit 326 may send a signal that alters the excitation current used by generator 324 which in turn, causes a change to the output current at bus 116.

In some examples, alternator 304 may include a dedicated communication port for transmitting the output current to ECU 112. For instance, alternator 304 may refrain from sending output current information via bus 114A and instead send the output current information as a separate signal using a separate communication port that is coupled to bus 314. In this example, alternator 304 may still receive the second information for controlling generator unit 324 via the communication port 114A (e.g., as one or more LIN messages). In another example, transmission of output current to ECU is directly done by current sensor using a dedicated communication port.

Clause 1. An alternator configured to provide a current for powering one or more loads, the alternator comprising: an output port configured to output the current for powering the one or more loads; one or more current sensors configured to measure a current level of at least a portion of the current being output via the output port to the one or more loads; and one or more communication ports configured to transmit information based on the current level measured by the one or more current sensors.

Clause 2. The alternator of clause 1, further comprising: a control unit configured to: receive, from the one or more current sensors, an indication of the current level measured by the one or more current sensors; and transmit, via the one or more communication ports, the information.

Clause 3. The alternator of clause 2, wherein the information is first information, the alternator further comprising: a generator unit configured to produce the current for powering the one or more loads, wherein the control unit is further configured to: receive, via the one or more communication ports, from an engine control unit, second information for adjusting the current level of at least a portion of the current being output via the first output to the one or more loads; and control the generator unit based on the second information.

Clause 4. The alternator of clause 3, wherein the control unit is further configured to receive the second information, via the one or more communication ports, in response to transmitting, via the one or more communication ports, the first information.

Clause 5. The alternator of any of clauses 2-4, wherein: the indication of the current level measured by the one of more current sensors comprises an analog signal; and the information comprises a digital signal.

Clause 6. The alternator of clause 5, wherein the digital signal comprises one of more messages based on a message based protocol.

Clause 7. The alternator of any of clauses 2-6, where the indication of the current level measured by the one or more current sensors comprises a digital signal.

Clause 8. The alternator of any of clauses 1-7, wherein the information is first information and the one or more communication ports comprise a first communication port, the alternator further comprising: a generator unit configured to produce the current for powering the one or more loads; a second communication port configured to receive second information for adjusting the current level of at least a portion of the current being output via the first output to the one or more loads, and a control unit configured to: receive, via the second communication port, from an engine control unit, the second information; and control the generator unit based on the second information.

Clause 9. The alternator of clause 8, wherein the control unit is further configured to receive the second information, via the second communication port, in response to the current sensor transmitting, via the first communication port, the first information.

Clause 10. The alternator of any of clauses 2-9, wherein: the first information comprises an analog signal; and the second information comprises a digital signal that includes one or more messages based on a message based protocol.

Clause 11. The alternator of any of clauses 1-10, wherein the current is a direct current, the alternator further comprising: a rectifier for converting an alternating current generated by the alternator to the direct current for powering the one or more loads.

Clause 12. The alternator of clause 11, wherein the rectifier comprises a plurality of phases and a single phase from the plurality of phases comprises the current sensor.

Clause 13. The alternator of any of clauses 10-12, wherein the rectifier excludes the one or more current sensors.

Clause 14. The alternator of any of clauses 1-13, wherein the current sensor is a Hall sensor.

Clause 15. An alternator configured to provide a direct current for powering one or more loads, the alternator comprising: an output port configured to output the direct current for powering the one or more loads; a rectifier for converting an alternating current generated by the alternator to the direct current for powering the one or more loads; one or more current sensors configured to measure a current level of at least a portion of the current being output via the output port to the one or more loads; and one or more communication ports configured to transmit information based on the current level measured by the one or more current sensors.

Clause 16. The alternator of clause 15, further comprising a control unit configured to; receive, from the one or more current sensors, an indication of the current level measured by the one or more current sensors; and transmit, via the one or more communication ports, to an engine control unit (ECU), the information.

Clause 17. The alternator of any of clauses 14-16, wherein the indication of the current level comprises an analog signal and the information comprises a digital signal that includes one or more messages based on a message based protocol.

Clause 18. An alternator configured to provide a direct current for powering one or more loads, the alternator comprising: an output port configured to output the direct current for powering the one or more loads; a rectifier for converting an alternating current generated by the alternator to the direct current for powering the one or more loads, wherein the rectifier comprises: a plurality of phases including a single phase that comprises one or more current sensors, the one or more current sensors being configured to measure a current level of at least a portion of the direct current being output via the output port to the one or more loads; and one or more communication ports configured to transmit information based on the current level measured by the one or more current sensors.

Clause 19. The alternator of clause 18, further comprising a control unit configured to: receive, from the one or more current sensors, an analog signal as an indication of the current level measured by the one or more current sensors; and transmit, via the one or more communication ports, to an engine control unit (ECU), the information as a digital signal that includes one or more messages based on a message based protocol.

Clause 20. The alternator of any of clauses 18-19, further comprising a generator unit configured to produce the alternating current.

Clause 21. A method comprising: receiving, by a control unit of an alternator, an indication of a current level measured by one or more current sensors of the alternator; generating, by the control unit, one or more first messages based on the current level; transmitting, by the control unit, the one or more first messages to an engine control unit (ECU); receiving, by the control unit, one or more second messages from the ECU in response to transmitting the one or more first messages; and controlling, by the control unit, a generator unit of the alternator based on the one or more second messages.

Clause 22. A computer-readable storage medium comprising instructions that, when executed, cause one or more processors of an alternator to perform the method of clause 21.

Clause 23. An alternator comprising: one or more current sensors and a control unit configured to perform the method of clause 21.

Clause 24. An alternator comprising: one or more current sensors and a control unit comprising means for performing the method of clause 21.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an alternator, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. An alternator of a vehicle, the alternator comprising:
an output port configured to output a current for powering one or more loads of the vehicle;
one or more current sensors configured to measure a current level of at least a portion of the current being output via the output port to the one or more loads;
an alternator control unit; and
one or more communication ports configured to transmit information indicative of the current level measured by the one or more current sensors.

2. The alternator of claim 1, wherein the alternator control unit is configured to:
receive, from the one or more current sensors, an indication of the current level measured by the one or more current sensors; and
transmit, via the one or more communication ports, the information.

3. The alternator of claim 2, wherein the information is first information, the alternator further comprising:
a generator unit configured to produce the current for powering the one or more loads,
wherein the alternator control unit is further configured to:
receive, via the one or more communication ports, from an engine control unit of the vehicle, second information for adjusting the current level of at least a portion of the current being output via the first output to the one or more loads; and
control the generator unit based on the second information.

4. The alternator of claim 3, wherein the alternator control unit is further configured to receive the second information, via the one or more communication ports, in response to transmitting, via the one or more communication ports, the first information.

5. The alternator of claim 2, wherein:
the indication of the current level measured by the one or more current sensors comprises an analog signal; and
the information comprises a digital signal.

6. The alternator of claim 5, wherein the digital signal comprises one or more messages that are formatted in accordance with a message based protocol.

7. The alternator of claim 2, wherein:
the indication of the current level measured by the one or more current sensors comprises a digital signal.

8. The alternator of claim 1, wherein the information is first information and the one or more communication ports comprise a first communication port, the alternator further comprising:
a generator unit configured to produce the current for powering the one or more loads; and
a second communication port configured to receive second information for adjusting the current level of at least a portion of the current being output via the first output to the one or more loads, wherein the alternator control unit is further configured to:
receive, via the second communication port, from an engine control unit of the vehicle, the second information; and
control the generator unit based on the second information.

9. The alternator of claim 8, wherein the alternator control unit is further configured to receive the second information, via the second communication port, in response to the current sensor transmitting, via the first communication port, to the engine control unit of the vehicle, the first information.

10. The alternator of claim 2, wherein:
the first information comprises an analog signal; and
the second information comprises a digital signal that includes one or more messages that are formatted in accordance with a message based protocol.

11. The alternator of claim 1, wherein the current is a direct current, the alternator further comprising:
a rectifier for converting an alternating current generated by the alternator to the direct current for powering the one or more loads.

12. The alternator of claim 11, wherein the rectifier comprises a plurality of phases and a single phase from the plurality of phases comprises the one or more current sensors.

13. The alternator of claim 11, wherein the rectifier excludes the one or more current sensors.

14. The alternator of claim 1, wherein the one or more current sensors comprise a Hall sensor.

15. An alternator of a vehicle, the alternator comprising:
an output port configured to output a direct current for powering one or more loads of the vehicle;
a rectifier for converting an alternating current generated by the alternator to the direct current for powering the one or more loads;
one or more current sensors configured to measure a current level of at least a portion of the current being output via the output port to the one or more loads;
an alternator control unit; and
one or more communication ports configured to transmit information indicative of the current level measured by the one or more current sensors.

16. The alternator of claim 15, wherein the alternator control unit is configured to:
receive, from the one or more current sensors, an indication of the current level measured by the one or more current sensors; and
transmit, via a communication port, to an engine control unit (ECU) of the vehicle, the information.

17. The alternator of claim 15, wherein the indication of the current level comprises an analog signal and the information comprises a digital signal that includes one or more messages that are formatted in accordance with a message based protocol.

18. An alternator configured to provide a direct current for powering one or more loads, the alternator comprising:
an output port configured to output the direct current for powering the one or more loads;
a rectifier for converting an alternating current generated by the alternator to the direct current for powering the one or more loads, wherein the rectifier comprises:

a plurality of phases including a single phase that comprises one or more current sensors, the current sensors being configured to measure a current level of at least a portion of the direct current being output via the output port to the one or more loads; and one or more communication ports configured to transmit information based on the current level measured by the one or more current sensors.

19. The alternator of claim 18, further comprising an control unit configured to:

receive, from the one or more current sensors, an analog signal as an indication of the current level measured by the one or more current sensors; and transmit, via the one or more communication ports, to an engine control unit (ECU), the information as a digital signal that includes one or more messages that are formatted in accordance with a message based protocol.

20. The alternator of claim 18, further comprising a generator unit configured to produce the alternating current.

* * * * *